United States Patent [19]
Yuda

[11] 3,894,309
[45] July 15, 1975

[54] GROMMET FOR PROTECTING A PIPE INSERTED IN AN OPENING OF A PLATE

[75] Inventor: Takuo Yuda, Yokohama, Japan

[73] Assignee: Nifco Inc., Tokyo, Japan

[22] Filed: Mar. 7, 1974

[21] Appl. No.: 449,123

[30] Foreign Application Priority Data
Mar. 13, 1973 Japan .............................. 48-30292

[52] U.S. Cl. .................................................... 16/2
[51] Int. Cl.² ............................................ B65D 7/48
[58] Field of Search ............ 16/2, 108, 109; 24/141; 85/32.1; 174/83, 152 R, 152 G, 153 G, 154, 167; 285/162, 338; 248/56, 27

[56] References Cited
UNITED STATES PATENTS

| | | | |
|---|---|---|---|
| 2,366,067 | 12/1944 | Smith | 285/260 X |
| 2,567,773 | 9/1951 | Krupp | 285/260 X |
| 2,935,340 | 5/1960 | St. Marie | 285/189 X |
| 3,090,115 | 5/1963 | Carr | 174/153 G |
| 3,366,356 | 1/1968 | Fisher | 174/153 G X |

*Primary Examiner*—Richard J. Scanlan, Jr.
*Attorney, Agent, or Firm*—Robert W. Beart; J. R. Halvorsen

[57] ABSTRACT

Disclosed is a synthetic thermoplastic resin grommet which is useful for protecting a pipe from surface injury which would be otherwise caused by rubbing of the pipe against the periphery of the associated opening of a plate.

5 Claims, 3 Drawing Figures

GROMMET FOR PROTECTING A PIPE INSERTED IN AN OPENING OF A PLATE

DETAILED DESCRIPTION OF THE INVENTION

This invention relates generally to a protecting grommet, and more particularly to a grommet which is useful for protecting a pipe or similar elongated object from surface injury which would be otherwise caused by rubbing of the pipe against the sharp edge of the periphery of an associated opening.

For instance, in introducing warm air from the engine compartment to the passenger compartment of an automobile, a rubber hose is inserted in the opening of an iron sheet constituting a wall separating the passenger compartment from the engine compartment. In this case a rubber grommet having an annular groove provided on the outer periphery of the annular body or a plastic flanged seat ring is fitted in the opening of the iron sheet to prevent injury to the surface of the rubber hose which would be otherwise caused by allowing the rubber hose to rub against the circumferential edge of the opening.

In fitting the rubber grommet or the plastic flanged ring in the opening of the plate, it is yieldingly deformed by applying a relatively strong force to it. For instance, the grommet is hammered into the opening of the plate, and is positively fixed to the opening when it returns to its original form. Quite often the grommet is damaged when it is forcedly inserted into the opening of the plate. Fixing the grommet in the opening of a sheet plate is a tedious and time-consuming work.

One object of this invention is to provide a grommet for protecting a pipe or similar elongated article from surface injury which would be otherwise caused by allowing the pipe to rub against the circumferential edge of an opening through which it extends.

Another object of this invention is to provide such a grommet free from the defects mentioned above which can easily be mounted without possibility of being damaged.

To attain these and other objects according to this invention there is provided an annular grommet of a synthetic thermoplastic material comprising two adjacent arc portions connected with each other by an intermediate hinge portion, each of said arc portions being connected, at the end opposite to the one adjacent to said intermediate hinge portion, to each of the opposite ends of the remaining semi-circular portion by means of associated hinge portions, and means for fixing the annular body to an opening of a plate.

This invention will be better understood from the following description which is made with reference to the accompanying drawings.

Figure 1:
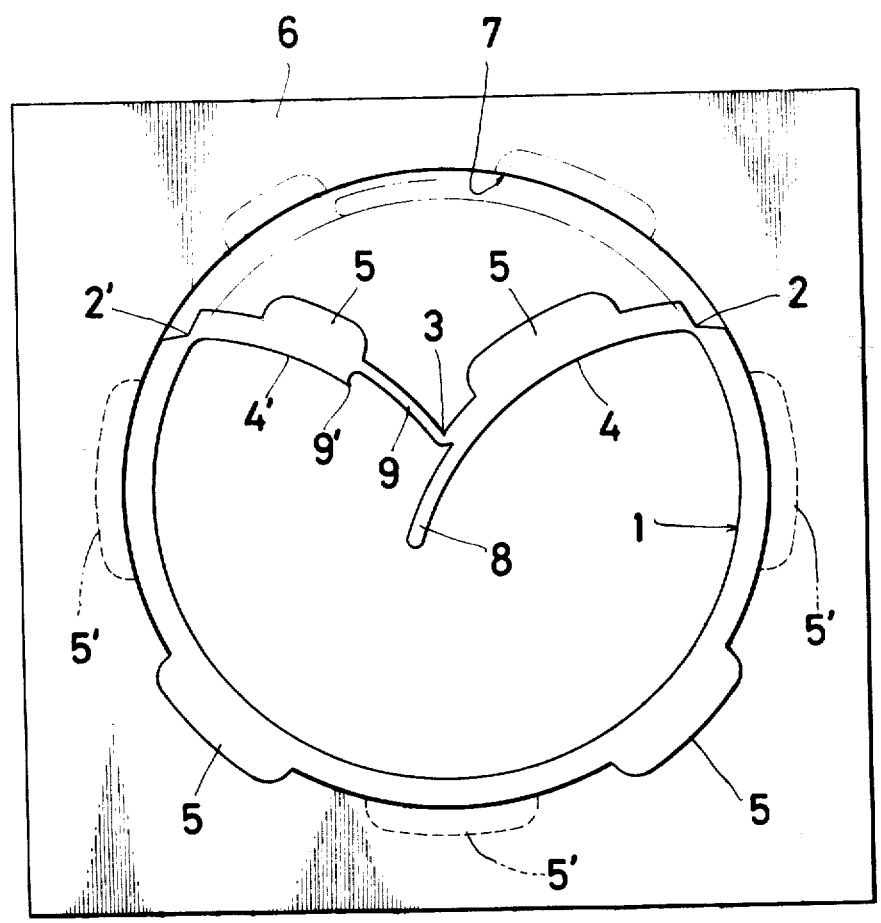
FIG. 1 shows the manner in which a grommet according to this invention is fixed to an opening of a plate.
Figure 2:
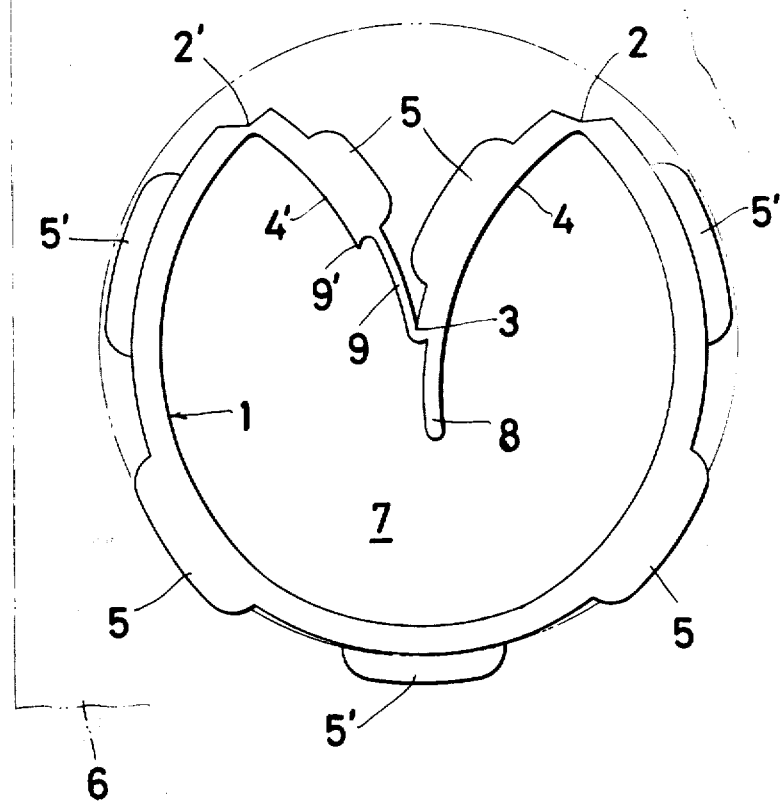
FIG. 2 shows the state in which the grommet is deformed before insertion into the opening of the plate.
Figure 3:
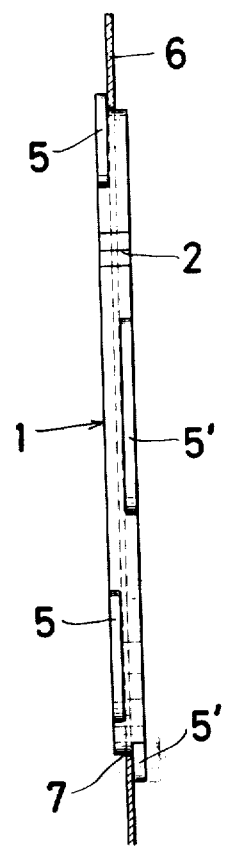
FIG. 3 is a side view of the grommet fixed to the opening of the plate.

Referring to the drawings, 1 is an annular grommet of a synthetic thermoplastic resin. 2 and 2' are notched portions which function as hinges, and 3 is an intermediate notched portion which also, functions as a hinge. These notched portions separated on the periphery of the annular body define two arc portions 4 and 4'. These arc portions can be collapsed on the notched portions in the form of "λ". 5 and 5' are opposite tab extensions projecting from the periphery of the annular body 1 and separated from each other by the distance equal to the thickness of a plate 6 to which the grommet is to be fixed, thus causing these tab extensions to grasp the peripheral thickness of an opening 7 of the plate when the grommet is fitted therein.

As a matter of course, the grommet has the same diameter as that of the opening of the plate to which the grommet is to be fixed.

In use, the arc portions 4 and 4' are yieldingly collapsed on hinges 2 and 2', and then the remaining semi-circular length is yieldingly collapsed. Thus the whole grommet is put in the opening of the plate, allowing the semi-circular portion to return to resiliently return to its original form. Then, the tab extensions of the semi-circular portion positively grasp the thickness of the periphery of the opening 7. The bent arc portions are pushed outward until the intermediate hinge 3 passes across the line extending from one to the other notched portion. Then, the arc portions snap back and return to the original form on the periphery of the opening.

The grommet is fixed to the periphery of the opening with its tab extensions positively grasping the peripheral thickness of the opening. Therefore, the grommet cannot slip off from the opening unless the two arc portions are yieldingly collapsed apart from the opening periphery.

As shown in the drawings, this embodiment has a tongue 8 provided to the intermediate hinge 3, thus making it easy to catch and pull the intermediate collapsible portion of the grommet. More specifically, the tongue 8 extends from one arc portion, and the other arc portion has a recess 9 provided to the end thereof adjacent to the intermediate hinge. The recess 9 is shaped in a complementary form to the tongue 8 so that the recess 9 may accommodate the tongue 8. Preferably the recess has a catch projection 9', which functions to catch the tongue 8 when fitted in the recess, thus preventing accidental inward-collapse of the two arc portions. The diameter of the grommet is equal to or somewhat larger than the diameter of the opening so as to assure positive fixing to the opening and to prevent the grommet from slipping off when a pipe or similar extended object is inserted into the opening. Once the pipe or similar extended object has been inserted in the opening, it prevents the inward collapse of the two arc portions, and therefore even if it should be moved through the opening, the grommet will not be disengaged from the opening.

The grommet according to this invention can be integrally moulded of a synthetic resin material, and therefore it can be produced at a low cost.

The grommet may have a groove provided on the periphery thickness of the annular body in place of opposite tab extensions 5 and 5'. In this alternative the diameter of the annular groove in the periphery of the ring grommet is made equal to the diameter of the opening of the plate.

What is claimed is:

1. A one piece annular grommet having top and bottom protions and defining therebetween a body of predetermined thickness of a synthetic thermoplastic material and comprising an arcuate body of more than 180° of the peripheral measurement of the grommet, two arc portions comprising the remainder of the periphery of said body, each arc portion having an integral hinge at the terminus of said arcuate body and a third hinge connecting said two arc portions and arcuate body capable of being flexed to diminish its diametral dimension to permit its mounting on the margin of an aperture in a complimentary work piece and tab means projecting from the top and bottom portions of said body adapted to engage opposite surfaces of the complimentary work piece with which the grommet is adapted to be associated.

2. An annular grommet according to claim 1 wherein a tongue comprises an extension from one of said arc portions, and the other arc portion has a recess which is so complementary to said tongue as to accommodate said tongue when fitted in said recess.

3. An annular grommet according to claim 1 wherein said hinge portions comprise a notched portion provided to the periphery of the annular body.

4. An annular grommet according to claim 1 wherein said tab means defines an annular groove provided on the outer periphery of the annular body.

5. An annular grommet according to claim 2 wherein said recess has a catch projection which functions to catch the end of said tongue when fitted in said recess.

* * * * *